United States Patent
Corda et al.

(10) Patent No.: US 9,016,561 B2
(45) Date of Patent: Apr. 28, 2015

(54) METHOD, SERVER AND MOBILE COMMUNICATION DEVICE FOR MANAGING UNIQUE MEMORY DEVICE IDENTIFICATIONS

(71) Applicant: NXP B.V., Eindhoven (NL)

(72) Inventors: Alexandre Corda, Nice (FR);
Dominique Brule, Antibes (FR);
Ismaila Wane, Tucson, AZ (US)

(73) Assignee: NXP, B.V., Eindhoven (NL)

( * ) Notice: Subject to any disclaimer, the term of this patent is extended or adjusted under 35 U.S.C. 154(b) by 0 days.

(21) Appl. No.: 13/954,894

(22) Filed: Jul. 30, 2013

(65) Prior Publication Data

US 2013/0316697 A1 Nov. 28, 2013

Related U.S. Application Data

(63) Continuation-in-part of application No. 12/669,923, filed as application No. PCT/IB2008/052920 on Jul. 21, 2008, now Pat. No. 8,517,252.

(30) Foreign Application Priority Data

Jul. 25, 2007 (EP) .................................... 07290929

(51) Int. Cl.
| | | |
|---|---|---|
| G06F 17/00 | (2006.01) | |
| H04W 8/18 | (2009.01) | |
| G06Q 20/32 | (2012.01) | |
| G06Q 20/34 | (2012.01) | |
| G06Q 20/36 | (2012.01) | |
| H04W 8/22 | (2009.01) | |

(52) U.S. Cl.
CPC ............. *H04W 8/18* (2013.01); *G06Q 20/3227* (2013.01); *G06Q 20/3278* (2013.01); CPC ... *G06Q 20/351* (2013.01); *G06Q 20/354* (2013.01); *G06Q 20/3552* (2013.01); *G06Q 20/3672* (2013.01); *H04W 8/22* (2013.01)

(58) Field of Classification Search
USPC ................................... 235/375, 380, 487, 492
See application file for complete search history.

(56) References Cited

U.S. PATENT DOCUMENTS

| | | | | |
|---|---|---|---|---|
| 7,570,941 | B2 * | 8/2009 | Mahajan ........................ | 455/411 |
| 7,707,369 | B2 * | 4/2010 | Nulkar et al. ................. | 711/156 |
| 8,117,631 | B2 * | 2/2012 | Bammert et al. ............. | 720/681 |
| 8,517,252 | B2 * | 8/2013 | Corda et al. .................. | 235/375 |
| 2003/0045287 | A1 | 3/2003 | Taniguchi | |
| 2006/0154646 | A1 | 7/2006 | Tung | |

FOREIGN PATENT DOCUMENTS

| | | |
|---|---|---|
| EP | 0 562 890 A1 | 9/1993 |
| WO | 02/058361 A2 | 7/2002 |
| WO | 03/077585 A1 | 9/2003 |

OTHER PUBLICATIONS

"Mifare Standard Card IC MF1 IC S50 Functional Specification—Revision 4.0", Philips Semiconductors, 18 pgs, retrieved from the internet at: www.synometrix.com/MF1_%20S501_Data_Sheet.pdf (Jul. 24, 1998).

Finkenzeller, Klaus "RFID Handbook—Second Edition", John Wiley & Sons Ltd, 434 pgs (2003).

International Search Report for Patent Application No. PCT/IB2008/052920 (Feb. 4, 2009).

* cited by examiner

*Primary Examiner* — Daniel St Cyr

(57) ABSTRACT

A method for server-based managing of unique memory device identifications, such as serial numbers, of memory devices having unique memory device identifications, such as emulated MIFARE devices like SmartMX cards, which memory devices are arranged in mobile communication devices, comprises keeping a repository (DB) of available memory device identifications; fetching a memory device identification from the repository and sending it to a specific mobile communication device; and instructing the mobile communication device to change the memory device identification of its associated memory device from its present value to the received new value. Further, the server instructs the mobile communication device to return the previous value of the memory device identification of its associated memory device. Finally, the server will add the returned memory device identification value to the repository of memory device identifications.

7 Claims, 4 Drawing Sheets

METHOD, SERVER AND MOBILE COMMUNICATION DEVICE FOR MANAGING UNIQUE MEMORY DEVICE IDENTIFICATIONS

This application is a Continuation of U.S. application Ser. No. 12/669,923 filed on Jun. 21, 2010 entitled "Method, server and mobile communication device for managing unique memory device identifications" which claims priority to EP Application No. EP 07290929.4 filed on Jul. 25, 2007 and PCT Application IB2008/052920 filed Jul. 21, 2008.

FIELD OF THE INVENTION

The invention relates to a method for server-based managing of unique memory device identifications, such as serial numbers, of memory devices, like MIFARE devices, preferably emulated MIFARE devices like SmartMX cards, which memory devices are arranged in mobile communication devices.

The invention further relates to a server having an arithmetic-logic unit and memory means and being connectable to a repository of available memory device identifications and being further connectable via a communication channel to mobile communication devices comprising memory devices having unique memory device identifications, like MIFARE devices, preferably emulated MIFARE devices, like SmartMX cards.

The invention further relates to a method for operating a mobile communication device that comprises a memory device having a unique memory device identification, like a MIFARE device, preferably an emulated MIFARE device, like a SmartMX card.

The invention further relates to a computer program product directly loadable into the memory of a mobile communication device being equipped with a memory device having a unique memory device identification, like a MIFARE device.

The invention further relates to a mobile communication device being adapted to process the computer program product mentioned in the above paragraph.

BACKGROUND OF THE INVENTION

The MIFARE® classic family, developed by NXP Semiconductors is the pioneer and front runner in contactless smart card ICs operating in the 13.56 MHz frequency range with read/write capability. MIFARE® is a trademark of NXP Semiconductors. MIFARE complies with ISO14443 A, which is used in more than 80% of all contactless smart cards today. The technology is embodied in both cards and card reader devices. MIFARE cards are being used in an increasingly broad range of applications (including transport ticketing, access control, e-payment, road tolling, and loyalty applications). MIFARE Standard (or Classic) cards employ a proprietary high-level protocol with a proprietary security protocol for authentication and ciphering. MIFARE® technology has become a standard for memory devices with key-protected memory sectors. One example for a published product specification of MIFARE® technology is the data sheet "MIFARE® Standard Card IC MF1 IC S50—Functional Specification" (1998). MIFARE® technology is also discussed in: Klaus Finkenzeller, "RFID Handbuch", HANSER, 3$^{rd}$ edition (2002).

The MIFARE Classic cards are fundamentally just memory storage devices, where the memory is divided into sectors and blocks with simple security mechanisms for access control. Each device has a unique serial number. Anticollision is provided so that several cards in the field may be selected and operated in sequence.

The MIFARE Standard 1k offers about 768 bytes of data storage, split into 16 sectors with 4 blocks of 16 bytes each (one block consists of 16 byte); each sector is protected by two different keys, called A and B. They can be programmed for operations like reading, writing, increasing value blocks, etc. The last block of each sector is called "trailer", which contains two secret keys (A and B) and programmable access conditions for each block in this sector. In order to support multi-application with key hierarchy an individual set of two keys (A and B) per sector (per application) is provided.

The memory organization of a MIFARE Standard 1k card is shown in FIG. 1. The 1024×8 bit EEPROM memory is organized in 16 sectors with 4 blocks of 16 bytes each. The first data block (block 0) of the first sector (sector 0) is the manufacturer block which is shown in detail in FIG. 2. It contains the serial number of the MIFARE card that has a length of four bytes (bytes 0 to 3), a check byte (byte 4) and eleven bytes of IC manufacturer data (bytes 5 to 15). The serial number is sometimes called MIFARE User IDentification (MUID) and is a unique number. Due to security and system requirements the manufacturer block is write protected after having been programmed by the IC manufacturer at production. However, the MIFARE specification allows to change the serial number during operation of the MIFARE card, which is particularly useful for MIFARE emulation cards like SmartMX cards.

SmartMX (Memory eXtension) is a family of smart cards that have been designed by NXP Semiconductors for high-security smart card applications requiring highly reliable solutions, with or without multiple interface options. Key applications are e-government, banking/finance, mobile communications and advanced public transportation.

The ability to run the MIFARE protocol concurrently with other contactless transmission protocols implemented by the User Operating System enables the combination of new services and existing applications based on MIFARE (e.g. ticketing) on a single Dual Interface controller based smart card. SmartMX cards are able to emulate MIFARE Classic devices and thereby makes this interface compatible with any installed MIFARE Classic infrastructure. The contactless interface can be used to communicate via any protocol, particularly the MIFARE protocol and self defined contactless transmission protocols. SmartMX enables the easy implementation of state-of-the-art operating systems and open platform solutions including JCOP (the Java Card Operating System) and offers an optimized feature set together with the highest levels of security. SmartMX incorporates a range of security features to counter measure side channel attacks like DPA, SPA etc. A true anticollision method (acc. ISO/IEC 14443-3), enables multiple cards to be handled simultaneously.

Building on the huge installed base of the MIFARE® interface platform, SmartMX enables e.g. Service Providers to introduce even more convenient ticketing systems and payment concepts. The high security (PKI and 3-DES) and the extended functionality of SmartMX allows for the integration of loyalty concepts, access to vending machines, or using an e-purse to pay fares instead of pre-paid electronic ticketing. The essential features of SmartMX cards are the following:

Contact interface UART according to ISO 7816.
    Contactless interface UART according to ISO 14443.
    Exception sensors for voltage, frequency and temperature.
    Memory management unit.

MIFARE® classic emulation.
JavaCard Operating System.
DES and/or RSA engine.
Up to 72 kilobyte EEPROM memory space.

It should be noted that the emulation of MIFARE Classic cards is not only restricted to SmartMX cards, but there may also exist other present or future smartcards being able to emulate MIFARE Classic cards.

Recently, mobile communication devices have been developed which contain memory devices having unique memory device identifications, like MIFARE devices, either being configured as MIFARE Classic cards or as MIFARE emulation devices like SmartMX cards. These mobile communication devices comprise e.g. mobile phones with Near Field Communication (NFC) capabilities, but are not limited to mobile phones.

While both MIFARE Classic cards and MIFARE emulation devices have proved to be a story of success in the market, these huge success has nevertheless revealed a bottleneck in the MIFARE specification, namely the relatively short length of the unique serial number of each MIFARE device, which is limited to 3 bytes. There is a risk that all theoretically available 16777216 serial numbers will be exhausted in the near future. In this regards one should know that in order to guarantee the uniqueness of the serial numbers of MIFARE devices allocation of serial numbers to these devices is exclusively controlled by NXP semiconductors. Nevertheless, in order to avoid constraint of NXP semiconductor's licensees for producing and operating MIFARE devices all licensees gets their own pools of serial numbers which they can administer and use according to their own needs and responsibilities.

The problem of exhaustion of unique memory identifications may also concern memory devices apart from MIFARE devices.

Another problem in conjunction with the unique serial numbers of MIFARE and other memory devices is that third parties may "phish" the serial numbers, thereby tracking the use of memory devices by their owners or, even worse, abusing the phished serial numbers for their own unauthorized purposes. This problem is of particular importance in relation to NFC mobile phones, since in this context Service Providers (these are entities like banks, public transport companies, loyalty programs owners etc. who provide contactless services to the users of NFC mobile phones) have the technological possibilities to phish the serial numbers of the memory devices of NFC mobile phones and to build services in their back-end systems by making use of the phished serial numbers, without involving Mobile Network Operators (MNOs) who provide the full range mobile services to the customer, particularly provide NFC terminals plus Over The Air (OTA) transport services, and other companies sponsoring the deployment of the NFC technology. Further, in near future NFC mobile phones will have the ability to change dynamically emulated MIFARE cards, ending with more and more serial numbers used.

OBJECT AND SUMMARY OF THE INVENTION

It is an object of the invention to provide methods of the types defined in the opening paragraph and in the third paragraph, and a server of the type defined in the second paragraph, in which the problems defined above are overcome.

In order to achieve the object defined above, with a method for server-based managing MIFARE User Identifications according to the invention characteristic features are provided so that such a method can be characterized in the way defined below, that is:

A method for server-based managing of unique memory device identifications, such as serial numbers, of memory devices having unique memory device identifications, like MIFARE devices, preferably emulated MIFARE devices like SmartMX cards, which memory devices are arranged in mobile communication devices, comprising:

keeping a repository of available memory device identifications;

fetching a memory device identification from the repository and sending it to a specific mobile communication device; and instructing the mobile communication device to change the memory device identification of its associated memory device from its present value to the received new value.

In order to achieve the object defined above, with a server according to the invention characteristic features are provided so that a server according to the invention can be characterized in the way defined below, that is:

A server having an arithmetic-logic unit and memory means and being connectable to a repository of available memory device identifications and being further connectable via a communication channel to mobile communication devices comprising memory devices having unique memory device identifications, like MIFARE devices, preferably emulated MIFARE devices like SmartMX cards, wherein the server is adapted to:

fetch a memory device identification from the repository and send it to a specific mobile communication device; and instruct the mobile communication device to change the memory device identification of its associated memory device from its present value to the received new value.

In order to achieve the object defined above, with a method for operating a mobile communication device according to the invention characteristic features are provided so that such a method can be characterized in the way defined below, that is:

A method for operating a mobile communication device that comprises a memory device having a unique memory device identification, like a MIFARE device, preferably an emulated MIFARE device, like a SmartMX card, comprising the steps of:

receiving via a communication channel a new memory device identification value and an instruction to change the memory device identification of its associated memory device from its present value to the received new value; and changing the memory device identification of the memory device to the received new value.

In order to achieve the object defined above, a computer program product being directly loadable into the memory of a mobile communication device that is equipped with a memory device having a unique memory device identification, like a MIFARE device, comprises software code portions for performing—when running on the mobile communication device—the steps of the method for operating a mobile communication device according to the above paragraph.

In order to achieve the object defined above, a mobile communication device according to the invention comprises an arithmetic-logic unit and a memory and processes the computer program product according to the above paragraph.

The characteristic features of the invention provide the advantage that the unique memory device identifications (MIFARE User Identifications or serial numbers, respectively) are dynamically changed in the memory (MIFARE) devices, thereby preventing unauthorized third parties from successfully phishing and tracking memory device identification of memory devices.

The measures respectively, provide the advantage that they allow to keep a repository of presently unused memory device identifications for future use, which repository is strictly kept under control of at least one server of a trusted authority. Thereby a greater amount of freely available memory device identifications can be achieved.

Preferably, the communication channel is configured either as a telecommunication network of a Mobile Network Operator (MNO) or as a computer network, wherein the server comprises interfaces to connect to said networks, in order to achieve communication with the mobile communication devices that can easily be established and is highly reliable.

In a particularly reliable embodiment of the invention the server is configured as a Trusted Service Manager (TSM) that securely distributes and manages Service Providers' services to Mobile Network Operators' (MNO) customer bases. High reliance and security is guaranteed, since a TSM is the single point of contact for the Service Providers to access their customer base through the MNOs and to manage the secure download and life-cycle management of the mobile NFC application on behalf of the Service Provider.

The present invention is perfectly suited for mobile phones with NFC capabilities that can be equipped with memory devices having unique memory device identifications, such as (emulated) MIFARE devices, like SmartMX cards.

The aspects defined above and further aspects of the invention are apparent from the exemplary embodiments to be described hereinafter and are explained with reference to these exemplary embodiments.

BRIEF DESCRIPTION OF THE DRAWINGS

The invention will be described in more detail hereinafter with reference to exemplary embodiments. However, the invention is not limited to them. The exemplary embodiments comprise memory devices being configured as MIFARE devices.

DESCRIPTION OF EMBODIMENTS

Figures 1, 2, 3:
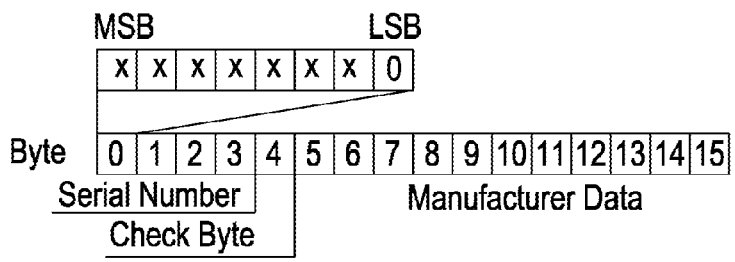
FIG. 1 shows the memory organization of a MIFARE Standard 1k EEPROM.
FIG. 2 shows the manufacturer block of a MIFARE memory.
FIG. 3 shows the sector trailer of a sector of MIFARE memory.
Figure 4:
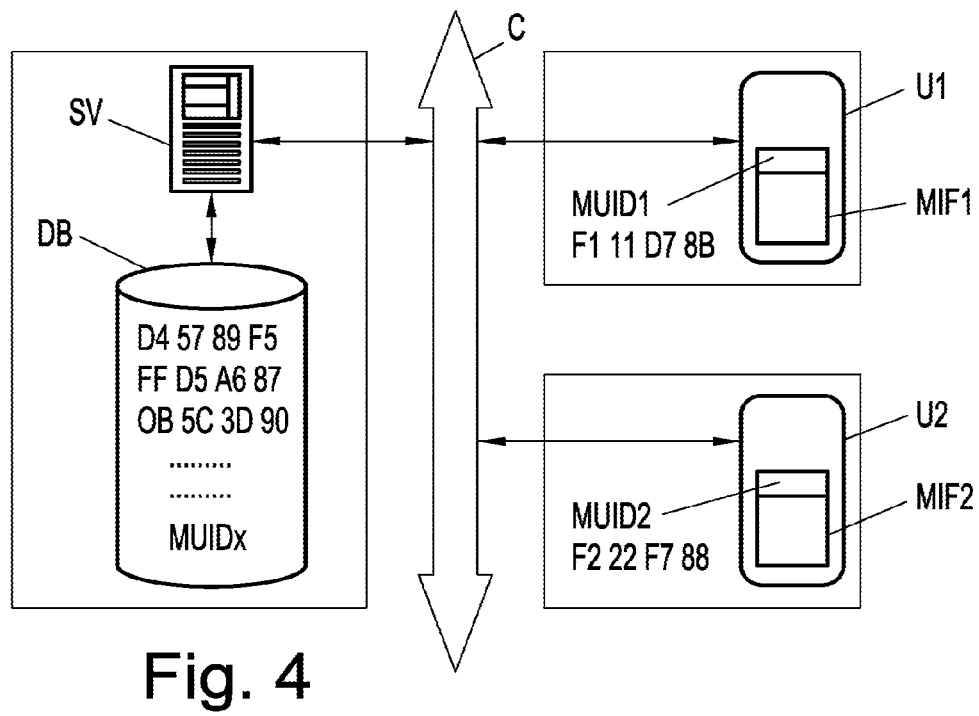
FIGS. 4 to 8 show flowcharts of the various steps of the present invention, of a first embodiment of the invention.

Referring to FIG. 4 a system according to the present invention is explained. This system comprises a server SV which is connected to a repository DB of available memory device identifications MUIDx (=serial numbers) for memory devices, e.g. being configured as MIFARE memory devices. It should be noted that the server SV may be configured as a single server or as a distributed server or even as a number of independent servers each of which managing different pools of memory device identifications MUIDx. In a similar manner the repository DB may be configured as a single repository or as a distributed repository or even as a number of independent repositories. The repository can be a data base, a file system etc. The server SV communicates over a communication channel C with a number of mobile communication devices U1, U2. The communication devices U1, U2 comprise memory devices being configured as MIFARE memory devices MIF1, MIF2 which are preferably configured as MIFARE emulation devices like SmartMX cards. Each of the MIFARE memory devices MIF1, MIF2 has a unique memory device identification MUID1, MUID2. For instance, the memory device identification MUID1 of the MIFARE memory device MIF1 of the first mobile communication device U1 is 'F1 11 D7 8B' and the memory device identification MUID2 of the MIFARE memory device MIF2 of the second mobile communication device U1 is 'F2 22 F7 88'. The mobile communication devices U1, U2 may e.g. be configured as NFC mobile phones. In one embodiment the communication channel C is configured as a telecommunication network of a Mobile Network Operator (MNO) providing full range mobile services to the customers, particularly providing NFC terminals plus Over The Air (OTA) transport services. In an alternative embodiment the communication channel C is configured as a computer network wherein the communication devices U1, U2 are either adapted to be connected to said computer network or the computer network comprises card reader terminals being configured to access the MIFARE memory devices MIF1, MIF2 of the communication devices U1, U2.

Figure 5:
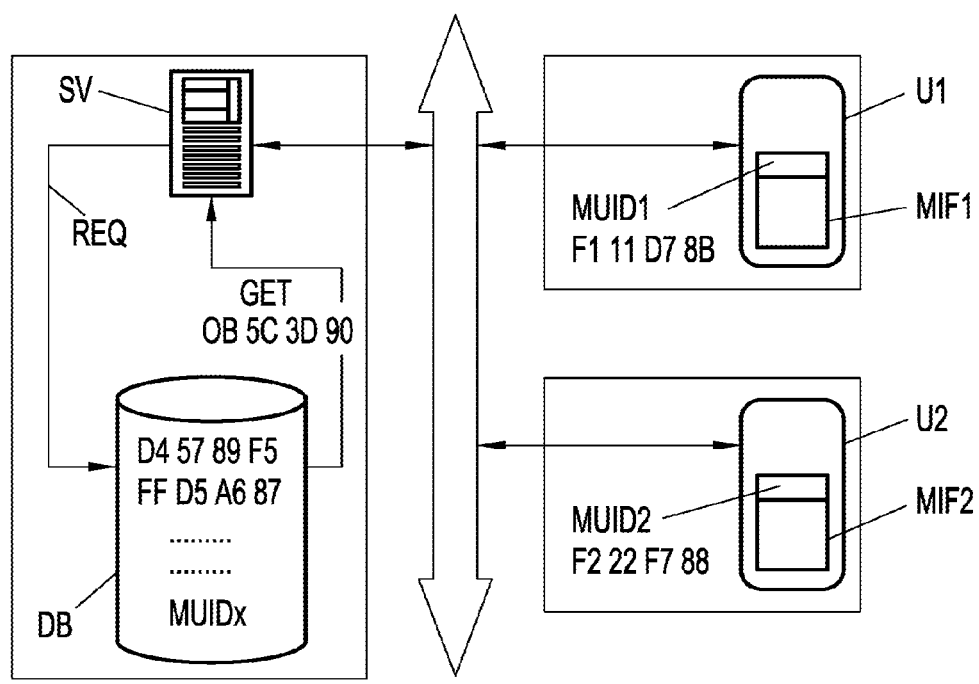

When the server SV wants to change the MUID of a specific one of the MIFARE memory devices MIF1, MIF2, e.g. the MUID1 of the MIFARE memory device MIF1 it sends a request REQ to the repository DB to fetch one of the unused memory device identifications MUIDx from the repository DB. The repository DB retrieves one free memory device identification from its pool, e.g. '05 5C 3D 90', deletes it from the pool and transmits it by means of a message GET to the server SV. These steps are shown in the flow chart of FIG. 5.

Figure 6:
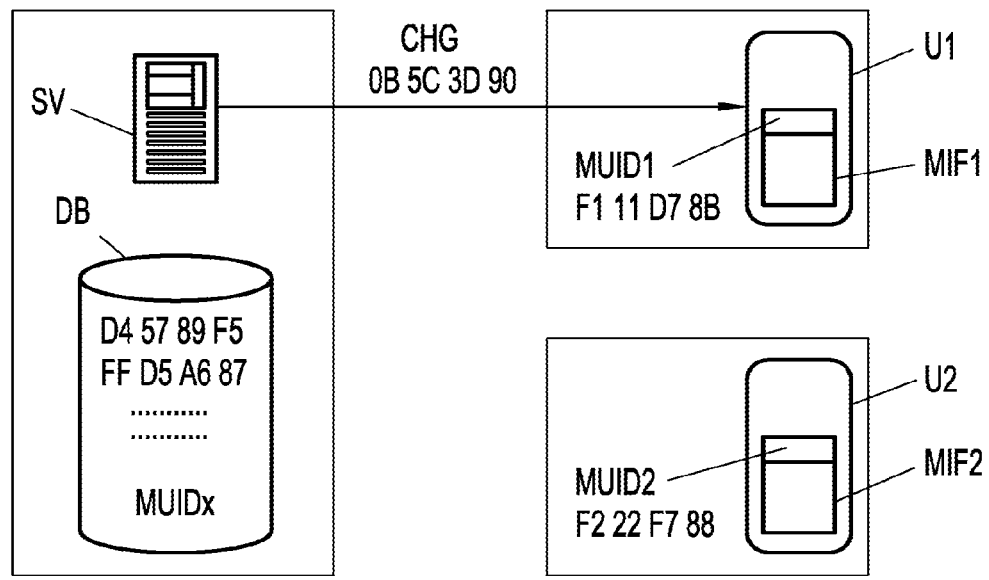

Next, as shown in the flow diagram of FIG. 6 the server SV sends an instruction CHG to the mobile communication device U1 that comprises MIFARE memory device MIF1. The instruction CHG includes the fetched memory device identification '05 5C 3D 90'. The instruction CHG requests the mobile communication device U1 to change the memory device identification MUID1 of its MIFARE memory device MIF1 from presently 'F1 11 D7 8B' to the new memory device identification '05 5C 3D 90'. For the sake of clarity communication channel C has been omitted from FIGS. 6 to 8 and the messages between server SV and repository DB as well as between server SV and mobile communication devices U1, U2 are represented by arrows directly connecting said devices in order to better illustrate the logic communication flow.

Figure 7:
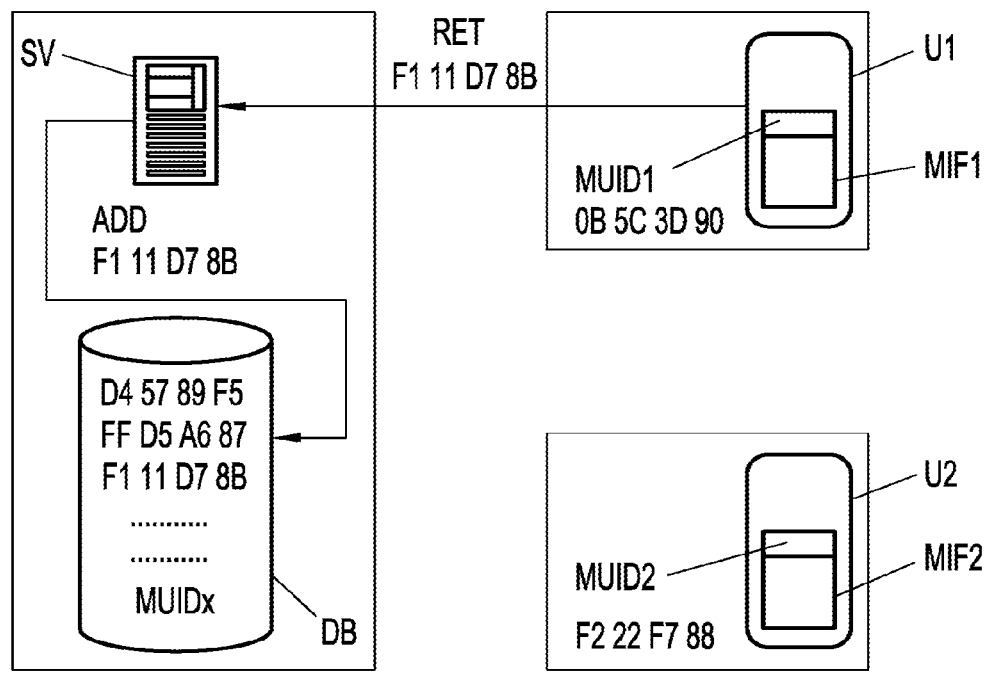

As it is depicted in the flow diagram of FIG. 7 after having changed the memory device identification MUID of the MIFARE memory device MIF1 the mobile communication device U1 replies to the server SV with a message RET which contains the previous memory device identification 'F1 11 D7 8B'. The server SV forwards this previous memory device identification 'F1 11 D7 8B' in a message ADD to the repository DB instructing the repository DB to add the memory device identification 'F1 11 D7 8B', which has become free, to its pool for future use. By means of this process the memory device identification (=serial number) of the first MIFARE memory device MIF1 has been successfully changed without decreasing the number of available memory device identifications MUIDx in the repository DB. It will be appreciated that the memory device identification MUID2 of the second MIFARE memory device MIF2 has not been influenced by this process.

Figure 8:
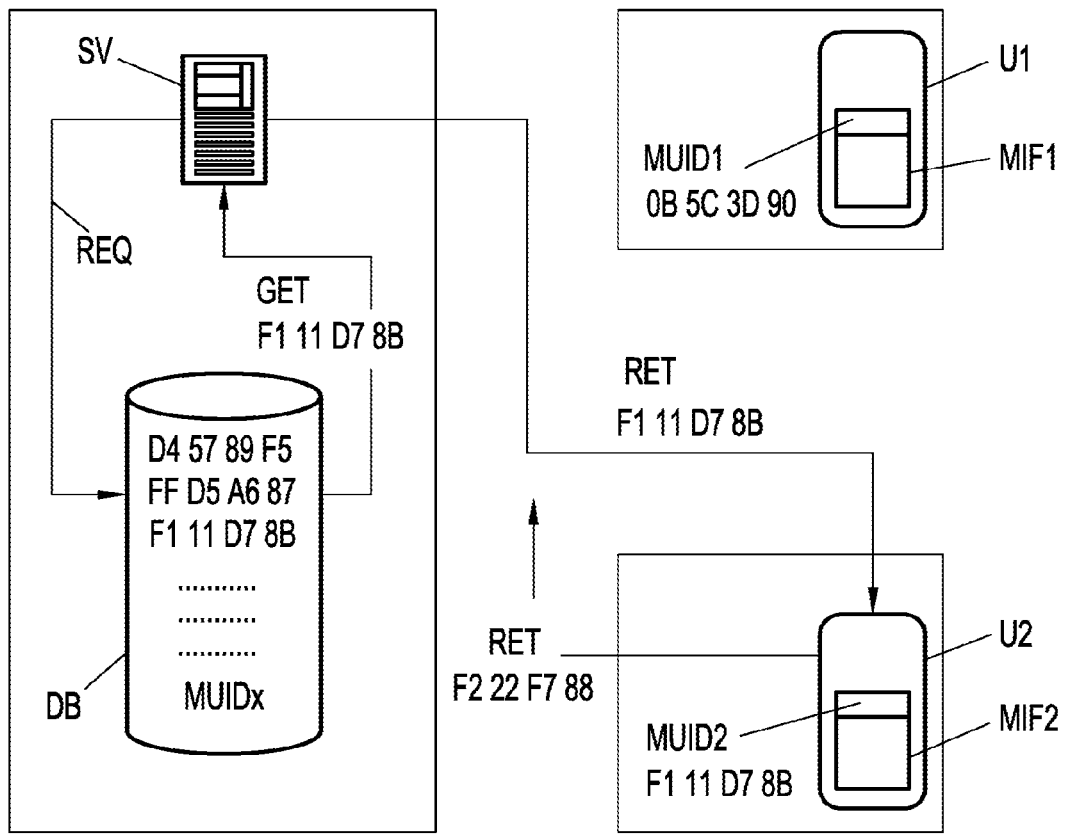

The memory device identification 'F1 11 D7 8B' newly added to the repository DB can e.g. be used to change the memory device identification MUID2 of the second MIFARE memory device MIF2, as shown in the flowchart of FIG. 8. In order to accomplish this the server SV sends a request REQ to the repository DB to fetch an unused memory device identification MUIDx from its pool. The repository DB retrieves the free memory device identification 'F1 11 D7 8B' from its pool, deletes it from the pool and transmits it by means of message GET to the server SV. The server SV sends the instruction CHG to the MIFARE memory device MIF2 which instruction includes the fetched memory device identification 'F1 11 D7 8B'. The mobile communication device U2 when receiving the instruction CHG changes the MUID2 of its MIFARE memory device MIF2 to 'F1 11 D7 8B' and returns the previous memory device identification 'F2 22 F7 88' by means of a message RET to the server SV which will instruct the repository DB to add it to its pool.

The server SV is preferably configured as a Trusted Service Manager (TSM). Such a TSM securely distributes and manages the Service Providers' services to the Mobile Network Operators' (MNO) customer base. The essential features of the Trusted Service Manager is to provide the single point of contact for the Service Providers to access their customer base through the MNOs and to manage the secure download and life-cycle management of the mobile NFC application on behalf of the Service Provider.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for operating a mobile phone that comprises a memory device having a unique memory device identification comprising:
   receiving from a server via a communication channel a new memory device identification value and an instruction to change the memory device identification of the mobile phone's associated memory device from a present value to a received new value; and
   changing the memory device identification of the memory device to the received new value.

2. The method of claim 1 wherein the memory device is a MIFARE memory device.

3. A mobile phone with an arithmetic-logic unit and a memory, wherein the mobile phone is adapted to process a computer program product directly loadable into the memory of the mobile phone equipped with a memory device having a unique memory device identification wherein the computer program product comprises software code portions for performing:
   receiving from a server via a communication channel a new memory device identification value and an instruction to change the memory device identification of the mobile phone's associated memory device from a present value to a received new value; and
   changing the memory device identification of the memory device to the received new value.

4. The mobile phone of claim 3 where the memory device is a MIFARE memory device.

5. A method for operating an NFC mobile phone that comprises a memory device having a unique memory device identification comprising:
   receiving from a server via a communication channel a new memory device identification value and an instruction to change the memory device identification of the NFC mobile phone's associated memory device from a present value to a received new value; and
   changing the memory device identification of the memory device to the received new value.

6. The mobile phone of claim 5 where the memory device is a MIFARE memory device.

7. A server configured as a Trusted Service Manager having an arithmetic-logic unit and memory and being connectable to a repository of available memory device identifications and being further connectable via a communication channel to mobile communication devices comprising memory devices having unique memory device identifications, wherein the server is designed to:
   fetch a memory device identification from the repository and send the memory device identification to a specific mobile communication device;
   instruct the mobile communication device to change the memory device identification of the mobile communication device's associated memory device from a present value to a received new value; and
   securely distribute and manage Service Provider's services to the Mobile Network Operator's customer bases.

* * * * *